3,570,181
HYBRID ALFALFA PRODUCTION
William H. Davis, West Bend, Wis., assignor to
L. Teweles Seed Company, Milwaukee, Wis.
No Drawing. Filed Jan. 23, 1968, Ser. No. 699,805
Int. Cl. A01h 1/02
U.S. Cl. 47—58                                      10 Claims

ABSTRACT OF THE DISCLOSURE

Seed capable of growing hybrid alfalfa is efficiently produced by the selective harvesting of the same from a cytoplasmic male sterile alfalfa seed parent which has been crossed with pollen from a D maintainer type alfalfa plant. The D maintainer type plant utilized in the process is selected so as to cause the formation of seed on the cytoplasmic male sterile seed parent which is capable of growing hybrid male sterile alfalfa plants to the substantially complete exclusion of off-types. The alfalfa plants grown from the seed may be optionally back-crossed with pollen from D maintainer type alfalfa plants.

BACKGROUND OF THE INVENTION

It has been recognized for many years that hybridization of closely related plants has often resulted in offspring having a combination of desirable traits which were previously possessed separately by the parent plants. Such hybrid plants have commonly also possessed a vigor which has rendered them of considerable economic importance particularly when agronomic crops are involved. While significant advances have been made in the production of hybrid corn and hybrid sorghum, many economically important crops remain in which no commercially practicable breeding technique has been developed for the production of a hybrid. Much of the difficulty experienced when attempts have ben made to develop a hybrid of many crops may be traced to the diverse reproduction systems and modes of pollination encountered.

In alfalfa the plants are tetraploids. This creates significant genetic problems with respect to isolating and understanding given gene systems. It also increases the difficulty of inbreeding for uniformity. Such uniformity is a highly desirable plant characteristic, and is of special importance in many crops when the plant is used in the production of a commercial product. For instance, a hybrid alfalfa having uniform genetic constituents would be of considerable value for use in the production of a dehydrated alfalfa products.

3. A process according to claim 1 which includes the

It is estimated that each year over one hundred million pounds of alfalfa are grown and consumed in the United States. However, there has remained an unfilled need for a process whereby seed capable of growing hybrid alfalfa may be uniformly and repeatedly produced. As is well known to those skilled in the propagation of alfalfa, the male and female elements of alfalfa are normally present on the same plant, and are located within perfect flowers which contain both elements in a juxtaposed relationship. As a result of this arrangement self-pollination as well as cross-pollination commonly occurs with the pollen being transmitted to a substantial degree by insects which visit many different alfalfa flowers. In the absence of some method to uniformly bring about the desired cross-pollination, to the substantial exclusion of self-pollination or other undesired pollination, the essentially unform production of seed capable of growing hybrid alfalfa has remained an elusive goal. Commercial alfalfa varieties currently marketed are commonly the progenies from open-pollinated seed or mixtures of inbreds or of hybrids between them, and are designated as "synthetics."

Reports are found in the literature of attempts to develop hybrid alfalfa which have involved the use of controlled pollination. Alfalfa Breeding by H. M. Tysdal, T. A. Kiesselbach, and H. L. Westover (1942) describes the emasculation of fertile plants by the immersion of individual alfalfa flowers in a chemical solution, as well as investigations with respect to the development and utilization of self-incompatible alfalfa plants. W. R. Childers in a July 1952 article appearing in Scientific Agriculture, 32: 351-364, describes two types of male sterility. One is concerned with recessive factors causing a complete sterile male condition and is described as a genetic type, and the other involves genetic factors causing partial pollen abortion. W. R. Childers together with H. A. McLennan in a March 1960 article appearing in the Canadian Journal of Genetics and Cytology, 2: 57-65, report on hybrid alfalfa research utilizing a male sterile alfalfa plant in which the male sterility demonstrates a recessive mode of inheritance. Testing of such a hybridization technique has indicated, however, that male sterility within succeeding generations is not maintained to any substantial degree, and that considerable quantities of seed capable of growing off-type alfalfa plants are inevitably harvested. No method is known for identifying and separating seed capable of producing such off-types short of actually growing the same.

It is an object of the invention to provide a commercially practicable process for the production of seed capable of growing male sterile hybrid alfalfa.

It is an object of the invention to provide a process in which seed capable of growing hybrid alfalfa may be harvested to the substantial exclusion of off-types.

It is another object of the invention to provide a process for the production of hybrid alfalfa which utilizes a male sterile seed parent in which the male sterility may be dominantly transmitted to the offspring when crossed with a suitable D maintainer type alfalfa plant.

It is a further object of the invention to provide a process which may be repeatedly conducted to produce uniform hybrid alfalfa.

These and other objects, as well as the scope, nature, and utilization of the invention will be apparent from the following detailed description and appended claims.

SUMMARY OF THE INVENTION

It has now been discovered that a process for the efficient production of seed capable of growing male sterile hybrid alfalfa plants comprises:

(a) Providing a cytoplasmic male sterile alfalfa plant, (b) Providing a D maintainer type alfalfa plant having the ability when crossed with the cytoplasmic male sterile alfalfa plant of enabling the formation of seed on the cytoplasmic male sterile alfalfa plant which is capable of growing male sterile alfalfa plants.

(c) Pollinating the cytoplasmic male sterile alfalfa plant with pollen from the D maintainer type alfalfa plant whereby seed is formed on said cytoplasmic male sterile alfalfa plant which is capable of growing hybrid male sterile alfalfa plants, and (d) Selectively recovering the seed which has formed on the cytoplasmic male sterile alfalfa plant.

DESCRIPTION OF PREFERRED EMBODIMENTS

It has been discovered that a cytoplasmic male sterile alfalfa plant may be isolated and effectively utilized as one of the two key components in an improved process for producing hybrid alfalfa. Such a male sterile alfalfa plant contains essentially normal female reproductive elements but is incapable of producing viable pollen. Of the various types of male sterility found to occur in relatively small numbers of alfalfa plants within a huge population of given varieties, it is essential that male sterile plants be selected for use in the present process which have a sterility attributable to conditions other than recessive transmission, genetic types, or chromosome abnormalities. More specifically, the male sterility must be the result of a specific type of cytoplasm designated c.m.s. The cytoplasmic male sterile plants utilized in the process contain the normal tetraploid number of chromosomes (sixteen pairs or thirty-two), without any gross chromosomal rearrangement, such as a reciprocal translocation, a lagging chromosome, a bridge, or other similar abnormality. Conventional techniques employing a light microscope may be used to confirm the chromosomal structure and number of a normal male sterile alfalfa plant.

Male sterile alfalfa plants suitable for use in the present process may be located by examining large populations of alfalfa plants of existing varieties. For example, cytoplasmic male sterile alfalfa plants have been successfully isolated from populations of the following varieties: Buffalo, Flandria, Ladak, Moapa, Ranger, and Vernal. Male sterile plants are preferably selected from fields of alfalfa plants which previously have been subjected to several years of adaptation via ecological competition. The search for male sterile plants may be conducted at any time of the year in which alfalfa is flowering. Two or more flowers from each plant are visually examined to identify for further testing those plants in which no pollen formation is apparent. To aid in this investigation a black plastic strip may be placed within an alfalfa flower of each plant at the location where the keel can be forced open, thereby tripping the blossom to expose the anthers. The strip may then be examined by use of the naked eye or with the aid of a light microscope to determine whether pollen is present.

The following system of plant classification was used to classify all of the plants examined:

(1) male sterile (m.s.)=no normal appearing pollen, only empty pollen coats, anthers shrunken and brown.
(2) Partial male sterile (p.m.s.)=a trace of normal appearing pollen, anthers shrunken and white in color.
(3) Partial fertile (p.f.)=moderate amounts of normal appearing pollen, anthers partially shrunken.
(4) Fertile (f.)=large amounts of normal appearing pollen, anthers full and plump.

Male sterile (m.s.) and partial male sterile (p.m.s.) plants appear at a very low frequency. These plants may be further examined with a light microscope to determine whether pollen is present within the shrunken anthers. The probable viability of the pollen found in the anthers can be ascertain by the use of various stains. Aceto carmine is an excellent stain for identifying the full normal appearing pollen grains from the shrunken abnormal types found in many anthers. When no pollen is found by the visual check, microscopic examination often reveals a low percentage of normal appearing pollen. These plants are classified as partial male sterile (p.m.s.) as compared to the totally male sterile (m.s.) plants which have no stainable pollen.

The selection of male sterile plants possibly suited for use in the present process is commonly an exacting and time consuming procedure. For instance, out of approximately fifty thousand alfalfa plants of the twenty-eight varieties which were examined, only ten plants were found which exhibited a high degree of male sterility of any type. Nine of the ten plants located were actually found by microscopic examination to exhibit only partial male sterility (p.m.s.). The reasons for the sterility exhibited by the ten plants was unknown. At least three reasons could be postulated for the sterility: (1) The plants could be genetic sterile, (2) The plants could be cytoplasmic or partially cytoplasmic male sterile, or (3) The sterility could be due to various chromosomal or genetic abnormalities.

Those male sterile plants which exhibit cytoplasmic male sterility must be identified and preserved. One satisfactory technique for determining cytoplasmic male sterility is available. This is conducted by crossing the male sterile plants with a large number of different male fertile alfalfa plants, e.g., more than one hundred, and examining the resulting $F_1$ progeny for male sterility. Of the ten male sterile plants initially selected from a population of twenty-eight varieties, only four of these were found to be of the cytoplasmic male sterile type (c.m.s.). When properly closed the $F_1$ offspring of these plants were either all male sterile or segregating as to male sterility. The cytoplasmic nature of the male sterility is confirmed by further $F_1$ crosses and back-crosses. Reciprocal back-crosses are desired as further proof of cytoplasmic male sterile transfer, but not possible on the male sterile component. Partial male sterile $F_1$'s can be back-crossed to the original male sterile plants. This allows the investigator to make observations concerning the nature of the male sterile transfer. The other six male sterile plants were discarded because their $F_1$ offspring produced by crossing with fertile male plants were accordingly nearly all fertile.

Microscopic examinations of the four remaining c.m.s. plants indicated that sometime prior to diad formation the pollen had aborted, and consequently only empty pollen sacs were visible. Occasionally, non-viable pollen grains may be found upon microscopic examination. This pollen possesses an abnormal appearance characterized by size differences. Generally it is larger or smaller than the normal stainable pollen. Repeated selfings of such plants indicate a complete lack of seed set under either field or greehouse conditions.

The majority of the crosses made even with cytoplasmic male sterile alfalfa plants (c.m.s.) segregate as to sterility in the offspring since the male fertile plant used in the cross commonly has the ability to restore complete or partial fertility to the offspring of the cross. Any resulting fertile plants which are produced are rogued out so that only the cytoplasmic male sterile plants are maintained for use in the process. These selected $F_1$ male sterile plants are again checked for male sterile transfer by back-crossing to the better transferring male fertile parents. The resulting $F_1BC_1$ are grown out and checked for sterility. If the progeny of these backcrosses are fully sterile, both parents are preserved and asexually propagated. If some partial male sterile progeny occur the back-cross process is repeated until all progeny are fully sterile.

In a preferred embodiment of the invention a selection is then made among the available male sterile plants to identify that plant which has the most desirable properties. For instance, a cytoplasmic male sterile (c.m.s.) plant having a high seed set index (i.e., grams of seed per plant) and superior forage properties is preferred. Once a selection is made the c.m.s. plant may be increased by (1) asexual reproduction or (2) by crossing with a suitable D maintainer type plant to produce a hybrid as described hereafter.

The D maintainer type alfalfa plant is the second key plant required in the present process for the efficient production of hybrid alfalfa. It is characterized by its ability, when crossed with a cytoplasmic male sterile alfalfa plant, which is either c.m.s. or p.m.s., of enabling the formation of $F_1$ seed on the male sterile alfalfa plant which is capable of growing into cytoplasmic male sterile alfalfa plants to the substantial exclusion of male fertile plants, i.e., less than about 10 percent male fertile plants and preferably less than about 5 percent male fertile plants. Stated differently, the D maintainer type plant makes possible an essentially uniform high degree of transfer of male sterility to the offspring of a cross with the cytoplasmic male sterile plant, and excludes the restoration of male fertility in the offspring. The D maintainer type plant accordingly makes possible the dominant transmission of male sterility, and provides for the first time a means for uniformly producing substantially all $F_1$ male sterile alfalfa plants from seed rather than by vegetative propagation, i.e., asexual propagation. When crossed with a male fertile plant the D maintainer type plant produces fertile offspring, but when crossed with a cytoplasmic male sterile plant, it produces male sterile offspring to the substantial exclusion of male fertile offspring. Cytological studies indicate that the D maintainer type plant possesses the normal tetraploid number of chromosomes, as do the $F_1$ male sterile offspring produced according to the invention.

Suitable D maintainer type plants for use in the present process may be derived from populations of existing alfalfa varieties. For example, acceptable D maintainer type plants have been derived from the following varieties: Arnims, Buffalo, Dawson, Ranger, and Socheville. No D maintainer type plants have been found to date in the Vernal and Washoe varieties. It has been found that a satisfactory D maintainer type plant may be developed by a program of selection and inbreeding. The identification of D maintainer type plants may be carried out concurrently with the discovery and development of the cytoplasmic male sterile alfalfa plants (c.m.s.). Initially, the first search for male steriles revealed the presence of nine p.m.s. plants and one c.m.s. plant. These ten plants were used as females in crossings with a large number of randomly selected male fertile plants. As soon as it was determined by the visual and microscopic examination of the $F_1$ progeny that certain male fertile plants were contributing to the male sterile transfer system, an inbreeding program was established for such males. Those males producing a high number of $F_1$ male sterile offspring were inbred, and forty-two $S_1$ progeny of each of these males were back-crossed to c.m.s. plants (fully male sterile). These $F_1$ back-crossed male sterile plants were again read for male sterile transfer. As soon as it was determined which of the $S_1$ plants possessed D maintainer type characteristics, they were again inbred. It is believed that at least one generation of inbreeding is necessary, and as many as five inbred generations may be necessary before full D maintainer type males are effectively isolated. Such inbreeding may be effected over a period of several years until the male sterile transfer system is fully perfected. At this stage, the resulting D maintainer type may be increased either by (1) asexual propagation, (2) further inbreeding and by maintenance of the seed generation.

Two of the presently highly productive D maintainer types have resulted from varying degrees of inbreeding and are being preserved in different manners. For example, one line designated $TD_{30}$, derived from the variety Buffalo, is an $S_5$ inbred, and is being maintained purely by further inbreeding resulting from back-crossing to the male sterile component (c.m.s.). The D maintainer type designated $TD_{46}$, derived from the variety Socheville, had sufficient male sterile transfer at the $S_1$ level and is being preserved solely by asexual propagation, and is not being utilized in any major back-cross program.

Naturally occurring D maintainer type plants do occur, but at a very low frequency. They are self-fertile and may be considered naturally occurring inbreds possessing the non-restoring genetic system of male sterile maintenance in $F_1$ crosses to c.m.s. plants. Generally the D maintainer type is found in segregating populations and inbreeding is practiced to stabilize the non-restorer factors and to eliminate the restorer factors.

Identification of D maintainer types requires a massive hand crossing program to c.m.s. plants. The $F_1$ offspring are next read for male sterility to evaluate the effectiveness of the D maintainer type in the male sterile transfer system. This enables the breeder to select those plants possessing the required unique genetic characteristic. Those plants which are found to be incapable of effecting the transfer of the male sterile trait to the offspring are designated as R type plants, and may be used as future pollinator males in hybrid combinations.

A further selection is made among the proven D maintainer type plants to select those plants which have the most desirable agronomic characteristics in their resulting hybrids. Once suitable D maintainer type plants for use in the process are isolated they may be multiplied (1) by further inbreeding, (2) by asexual propagation, or (3) by inter-pollination between two or more D maintainer type plants.

Once a series of c.m.s. and D maintainer type plants have been isolated and genetically stabilized it is possible to convert by back-crossing any given plant having other desirable characteristics to either the c.m.s. or the D maintainer type. Thus it is not always necessary to go into unknown alfalfa populations to repeat the overall process of locating new c.m.s. or D maintainer sources.

Hybrid alfalfa production according to the present process involves the use of a cytoplasmic male sterile plant (c.m.s.) as the seed parent or female, and the use of the D maintainer type alfalfa plant as the pollinator or male. Pollen transfer from the D maintainer type plant to the cytoplasmic male sterile plant may be accomplished by a variety of means. It has been surprisingly found that pollen carrying insects, such as honey bees or leaf cutter bees, commonly choose to visit the seed parent in spite of its lack of pollen, and thereby effectively serve to transmit pollen to the same, and to accomplish the desired cross-pollination. Other mechanical pollen transfer techniques are also possible, but have been found to offer no advantages over the simple pollen transfer which is provided to a substantial degree by insects. Toothpicks or knife blades have been used to transfer pollen to produce limited amounts of $F_1$ male sterile seed, but are of limited value in the formation of large commercial lots of seed. Since the cytoplasmic male sterile parent is incapable of producing pollen, the pollination thereof is accomplished exclusively by pollen from the D maintainer type plant.

In a preferred embodiment of the invention an essentially uniform population of cytoplasmic male sterile alfalfa plants are grown in pollinating proximity to an essentially uniform population of D maintainer type alfalfa plants. The actual pattern for the plants may be varied greatly, but is preferably selected so that the seed capable of growing hybrid male sterile alfalfa which is uniformly formed upon the seed parent may be efficiently harvested to the substantial exclusion of any seed formed upon the D maintainer type plants. For instance, the cytoplasmic male sterile plants and the D maintainer type plants may be grown in alternating rows. Commonly each row of the cytoplasmic male sterile plants is alternated with each row of the D maintainer plants. Experience has indicated, however, that a group of up to three adjoining rows of the cytoplasmic male sterile plants may be effectively alternated with a group of up to three adjoining rows of the D maintainer plants. Such an arrangement of adjoining rows of like plants makes possible a more efficient seed recovery using larger equipment.

Once seed capable of growing male sterile hybrid alfalfa has formed upon the seed parent, it may be selectively recovered or harvested by any suitable technique which is known to those skilled in the art. For instance, the seed may be harvested by use of combines or hand harvested for subsequent threshing by use of a plot thresher.

The seed capable of growing hybrid alfalfa is preferably maintained under conditions designed to preserve maximum viability prior to its planting. Any seed formed upon the D maintainer type plants may also be selectively recovered. While such seed is not capable of growing hybrid alfalfa, it is useful in the increase of the D maintainer type.

Hybrid alfalfa plants produced by growing the seed formed on the cytoplasmic male sterile plants may be optionally back-crossed with the D maintainer type plants (1) to produce increased quantities of hybrid alfalfa seed, and (2) to introduce to a greater degree the characteristics of the D maintainer type plant into the resulting hybrid. If desired, such back-crossing may be conducted continually for many generations, with seed capable of growing hybrid male sterile alfalfa being selectively recovered from the seed parent and subsequently planted. It is, of course, highly desirable that the properties of the D maintainer type plant which are increasingly introduced into the hybrid be outstanding.

The process of producing the $F_1$ male sterile alfalfa seed may give rise to a single-cross hybrid which may be used directly for commercial seed. However, the $F_1$ male sterile or the $F_1BC$ male sterile seed produced may also be used directly for the production of commercial scale two-way, three-way, four-way or top-cross hybrids.

The present process makes it possible for the first time to repeatedly produce a uniform crop of hybrid alfalfa having (1) more leaves of higher protein content, (2) smaller stems for better curing, (3) higher tonnage per acre, (4) increased disease resistance and insect tolerance, and (5) improved winter hardiness and other desirable agronomic characteristics.

Although the invention has been described with preferred embodiments, it is to be understood that variations and modifications may be resorted to as will be apparent to those skilled in the art. Such variations and modifications are to be considered within the purview and scope of the claims appended hereto.

I claim:

1. A process for the efficient production of seed capable of growing hybrid alfalfa plants comprising:
    (a) growing an essentially uniform population of cytoplasmic male sterile alfalfa plants in pollinating proximity to an essentially uniform population of D maintainer type alfalfa plants having the ability when crossed with said cytoplasmic male sterile alfalfa plants of enabling the formation of seed on said cytoplasmic male sterile alfalfa plants which is capable of growing male sterile plants,
    (b) crossing said cytoplasmic male sterile alfalfa plants and said D maintainer type alfalfa plants with the aid of pollen carrying insects whereby seed is formed on said cytoplasmic male sterile alfalfa plants which is capable of growing hybrid male sterile alfalfa plants, and
    (c) selectively recovering the seed which has formed on the cytoplasmic male sterile alfalfa plants.

2. A process according to claim 1 in which said cytoplasmic male sterile alfalfa plants and said D maintainer type alfalfa plants are grown in alternating rows.

3. A process according to claim 1 which includes the additional step of selectively recovering any seed formed on said D maintainer type alfalfa plants.

4. A process according to claim 1 in which said D maintainer type alfalfa plants are an inbred line.

5. A process according to claim 1 wherein said pollen carrying insects are bees.

6. A process for the efficient production of seed capable of growing hybrid alfalfa plants comprising:
    (a) providing an essentially uniform population of cytoplasmic male sterile alfalfa plants,
    (b) providing an essentially uniform population of D maintainer type alfalfa plants having the ability when crossed with said cytoplasmic male sterile alfalfa plants of enabling the formation of seed on said cytoplasmic male sterile alfalfa plants which is capable of growing male sterile alfalfa plants,
    (c) pollinating said cytoplasmic male sterile alfalfa plants with pollen from said D maintainer type alfalfa plants with the aid of pollen carrying insects whereby seed is formed on said cytoplasmic male sterile alfalfa plants which is capable of growing a succeeding generation of cytoplasmic male sterile alfalfa plants,
    (d) selectively recovering seed formed on said cytoplasmic male sterile alfalfa plants,
    (e) growing at least a portion of the resulting seed to produce an essentially uniform population of a succeeding generation of cytoplasmic male sterile alfalfa plants,
    (f) back-crossing the resulting succeeding generation of cytoplasmic male sterile plants with pollen derived from an essentially uniform population of D maintainer type alfalfa plants with the aid of pollen carrying insects to produce seed on said succeeding generation of cytoplasmic male sterile alfalfa plants which is capable of growing additional cytoplasmic male sterile alfalfa plants, and
    (g) selectively recovering the resulting seed which has formed on said succeeding generation of cytoplasmic male sterile alfalfa plants.

7. A process according to claim 6 wherein said uniform populations of cytoplasmic male sterile alfalfa plants and said uniform populations of D maintainer type alfalfa plants are provided in alternating rows.

8. A process according to claim 6 which includes the additional steps of recovering any seed formed on said D maintainer type alfalfa plants.

9. A process according to claim 6 wherein said populations of D maintainer type alfalfa plants are in inbred lines.

10. A process according to claim 6 wherein said pollen carrying insects are bees.

References Cited

UNITED STATES PATENTS 2,753,663   7/1956   Jones ---------------- 47—58

OTHER REFERENCES

Inheritance of Male Sterility in the Onion and the Production of Hybrid Seed, Jones et al., American Soc. for Hort. Sci., vol. 43, 1943, pp. 189–194 relied on. Copy in Gp. 337 in 47—Hybrid Corn.

Utilization of Male Sterility in Breeding Superior-Yielding Sugar Beets, Owen, Amer. Soc. Sugar Beet Technologists, 1948, pp. 156–161 relied on. Copy in Gp. 337 in 47—Hybrid Corn.

ROBERT E. BAGWILL, Primary Examiner

U.S. Cl. X.R.

47—1

UNITED STATES PATENT OFFICE
CERTIFICATE OF CORRECTION

Patent No. 3,570,181　　　　　　　　　　Dated March 16, 1971

Inventor(s) William H. Davis

It is certified that error appears in the above-identified paten and that said Letters Patent are hereby corrected as shown below:

Column 1, line 37, change "ben" to --been--. Column 1, lir change "products" to --product--. Column 1, line 50, delete line. Column 1, line 66, change "unform" to --uniform--.

Column 3, line 52, change "ascertain" to --ascertained--.

Column 4, line 11, change "closed" to --crossed--. Column line 33, change "greehouse" to --greenhouse--. Column 4, line 64, change "c.m.s." to --m.s.--.

Column 5, line 26, change "c.m.s." to --m.s.--.

Column 6, line 43, insert --planting-- after "actual".

Column 8, line 39, delete --in-- after "are". Column 8, lir in OTHER REFERENCES, insert --<u>Male Sterility - A Step Toward I Alfalfa</u>, by W. H. Davis and W. W. Oppel, CROPS & SOILS MAGAZ January, 1966.--.

Signed and sealed this 10th day of August 1971.

(SEAL)
Attest:

EDWARD M. FLETCHER, JR.　　　　　　WILLIAM E. SCHUYLER, JR.
Attesting Officer　　　　　　　　　　Commissioner of Patents